(12) United States Patent
Hatakeyama et al.

(10) Patent No.: US 7,556,856 B2
(45) Date of Patent: Jul. 7, 2009

(54) FINE PARTICLE COMPOSITION AND LIGHT-SHIELDING FILM USING THE SAME

(75) Inventors: Akira Hatakeyama, Shizuoka (JP); Hiroyuki Hirai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 316 days.

(21) Appl. No.: 10/994,437

(22) Filed: Nov. 23, 2004

(65) Prior Publication Data

US 2005/0112364 A1    May 26, 2005

(30) Foreign Application Priority Data

Nov. 25, 2003  (JP)  ............. 2003-393838
Mar. 31, 2004  (JP)  ............. 2004-105200

(51) Int. Cl.
*B32B 15/02* (2006.01)
*B32B 5/16* (2006.01)
*C08K 3/10* (2006.01)

(52) U.S. Cl. .................. 428/328; 428/323; 428/336; 427/162; 427/164; 524/403; 524/406; 524/413

(58) Field of Classification Search .............. None
See application file for complete search history.

(56) References Cited

U.S. PATENT DOCUMENTS 4,826,727 A * 5/1989 Glaser ................. 428/403
5,714,286 A * 2/1998 Uchikawa et al. ........ 430/6
2004/0157141 A1 * 8/2004 Ito ........................ 430/7
2004/0257502 A1 * 12/2004 Hatakeyama et al. ..... 349/110

FOREIGN PATENT DOCUMENTS

| JP | 62-9301 A | | 1/1987 |
|---|---|---|---|
| JP | 7-218715 A | | 8/1995 |
| JP | 10133365 A | * | 5/1998 |
| JP | 11-202123 A | | 7/1999 |
| JP | 2000-56126 A | | 2/2000 |

OTHER PUBLICATIONS

"Color TFT Liquid Crystal Display", Semiconductor Equipment and Materials International, pp. 218-220, Jul. 20, 1996, published by Kyoritsu Shuppan Co., Ltd.

* cited by examiner

*Primary Examiner*—Monique R Jackson
(74) *Attorney, Agent, or Firm*—Sughrue Mion, PLLC

(57) ABSTRACT

The present invention provides a light-shielding film arranged in a display device and shading a part of a display screen as a part of a color filter, which film includes fine metallic compound particles having an average particle diameter of 60 to 3000 nm and a high-molecular-weight binder, and has an optical density of 2.0 or more in a light-shaded region.

18 Claims, No Drawings

FINE PARTICLE COMPOSITION AND LIGHT-SHIELDING FILM USING THE SAME

CROSS-REFERENCE TO RELATED APPLICATIONS

This Application claims priority under 35 USC 119 from Japanese Patent Application Nos. 2003-393838 and 2004-105200, the disclosures of which are incorporated by reference herein.

BACKGROUND OF THE INVENTION

1. Field of the Invention

The present invention relates to a light-shielding film arranged in a display device to improve the visual quality of color filters in liquid crystal, plasma, EL, and CRT display devices and the like, a method of producing the same, and a fine metallic compound particle composition used therein.

2. Description of the Related Art

A light-shielding film for use in a display device (hereinafter, a "light-shielding film") refers to a black edge arranged in a display device such as a liquid crystal display, a plasma display, an EL display, a CRT display, or the like; to a checked or striped black edge (black matrix) around pixels; and to a dotted or linear black pattern for light shielding in a Thin Film Transistor (TFT).

An example of a light-shielding film is a black matrix formed around red, blue and green pixels in a color filter, so as to prevent contrast from being reduced by light leakage.

Another example is a light-shielding film arranged on a TFT so as to prevent deterioration of image quality due to electric current leakage caused by TFT light, in a liquid crystal display element in an active matrix driving system utilizing TFT.

In such light-shielding films, a light shielding property equivalent to an optical density of 2 or more is normally required. With regard to the visual quality of the display device, the color of the light-shielding film is preferably black.

Conventionally, when preparing a light-shielding film having high light-shielding properties, use of metal is a viable option. Such a light-shielding film can be prepared, for example, by: forming a metallic film by vapor deposition or sputtering; applying a photoresist onto the metallic film; exposing the photoresist layer to light via a photomask having a pattern for the light-shielding film and then developing it; etching the exposed metallic film; and, finally, removing the resist layer from the metallic film (see "Color TFT Liquid Crystalline Display" (in Japanese), pp. 218-220 published on Jul. 20, 1996 by Kyoritsu Shuppan).

Since a metallic film is used in this method, a high light-shielding effect can be achieved even if the film is thin; however, the method requires the steps of forming a vacuum film, such as vapor deposition or sputtering, and etching step, which significantly increases costs. In addition, because metallic films have a high refractive index, there is also the disadvantage that display contrast is impaired in bright daylight. While it is possible to remedy this problem by using a low-refractive chrome film (consisting of, for example, two layers, such as one of metallic chrome and one of chrome oxide), this inevitably increases costs yet further. Moreover, the chrome used most frequently in this method is problematic in terms of its highly detrimental impact on the environment.

On the other hand, a technique exists whereby a light-shielding film is formed by using carbon black in order to provide a light-shielding film having a low refractive index (see Japanese Patent Application Laid-Open (JP-A) No. 62-9301). Such a light-shielding film is produced by applying a photosensitive resin composition containing carbon black onto a substrate and drying it thereon, followed by light exposure and development.

However, because the optical density of carbon black per unit coating amount is lower than that of fine metal particles, it is necessary to increase the thickness of the film in order to ensure a high shielding property and optical density. This has the disadvantage that when red, blue and green pixels are formed subsequent to the formation of the light-shielding film, bubbles are generated or it is difficult to form uniform pixels. Further, a black matrix containing fine particles of nickel sulfide formed by using an electroless plating technique is known (see JP-A No. 7-218715). However, a disadvantage of this method is that the resulting fine particles have a small particle diameter (average particle diameter 30 nm or less), such that the color of the particles is not absolute black and it is difficult to achieve a film thickness of 0.5 μm or less. Further, the plating solution used in the production process has a major detrimental impact on the environment.

SUMMARY OF THE INVENTION

The present invention has been made in view of the foregoing circumstances and provides a light-shielding film for use in a display device, which is a thin film having high light-shielding performance, a lower burden on the environment and excellent hue.

In view of such circumstances, the present inventors conducted extensive research, as a result of which they found that use of a light-shielding film obtained by using a specific fine metallic compound particle composition provides an effective solution to the above problems, and thereby completed the present invention.

A first aspect of the invention is to provide a fine particle composition comprising colored fine metallic compound particles, a dispersing medium and a binder, wherein after the fine particle composition is formed into a film, the film has an optical density of 2.0 or more per 1 μm of dry-film thickness.

A second aspect of the invention is to provide a light-shielding film arranged in a display device and shading a part of a display screen as a part of a color filter, which comprises fine metallic compound particles having an average particle diameter of 60 to 3000 nm and a high-molecular-weight binder, and has an optical density of 2.0 or more in a light-shading region.

A third aspect of the invention is to provide a display substrate having the light-shielding film in the second aspect of the invention.

A fourth aspect of the invention is to provide a color filter for a display device comprising the light-shielding film in the second aspect of the invention.

A fifth aspect of the invention is to provide a transfer material comprising a colored layer formed by applying a coating solution, containing the fine particle composition in the first aspect of the invention, to a temporary support and drying it thereon.

A sixth aspect of the invention is to provide a method of forming a light-shielding film arranged in a display device and shading a part of a display screen as a part of a color filter, comprising transferring the colored layer of the transfer material in the fifth aspect of the invention onto a substrate, wherein the light-shielding film comprises fine metallic compound particles having an average particle diameter of 60 to 3000 nm and a high-molecular-weight binder, and has an optical density of 2.0 or more in a light-shading region.

A seventh aspect of the invention is to provide a coating solution composition for forming a light-shielding film arranged in a display device and shading a part of a display screen as a part of a color filter, and containing the fine particle composition in the first aspect of the invention, wherein the light-shielding film comprises a high-molecular-weight binder, and has an optical density of 2.0 or more in a light-shading region.

An eighth aspect of the invention is to provide a method of forming a light-shielding film arranged in a display device and shading a part of a display screen as a part of a color filter, comprising applying the coating solution composition in the seventh aspect of the invention to a substrate or a temporary support.

DETAILED DESCRIPTION OF THE INVENTION

The present invention relates to a light-shielding film arranged in a display device and shading a part of a display screen as a part of a color filter, which comprises fine metallic compound particles having an average particle diameter of 60 to 3000 nm and a high-molecular-weight binder, and has an optical density of 2.0 or more in a light-shading region; a method of producing the same; and a fine metallic compound particle composition used therein.

Hereinafter, the present invention is described in detail.

[Fine Metallic Compound Particles]

First, the fine metallic compound particles used in the invention are described in detail.

"Metal" as mentioned in relation to the invention refers to those metals described in "Metal" (p. 444) in "Iwanami Rikagaku Jiten" (Iwanami Physical and Chemical Dictionary; 5th ed., 1998, published by Iwanami Shoten). Among these metals, metals in groups 3 to 13 in the long form of the periodic table are preferable, among which gold, silver, copper, palladium, tungsten and titanium are particularly preferable. Among these, silver is particularly preferable from the viewpoint of safety, costs, and other considerations.

The "metallic compound" referred to in the invention is a compound including at least one of the metals mentioned above and a non-metallic element.

Examples of compounds comprising a metal and another element includes metal oxides, sulfides, sulfates, carbonates, and the like. Among these compounds, metal sulfides are particularly preferable with respect to color and easy formation of fine particles. Examples of such metallic compounds include copper(II) oxide, iron sulfide, silver sulfide, copper (II) sulfide and titanium black, among which silver sulfide is particularly preferable from the viewpoint of color, easy formation of fine particles, and the stability thereof.

The fine metallic compound particles referred to in the invention include:

(1) fine particles of the metallic compound,
(2) fine particles of a composite of two or more kinds of fine metallic compound particles, and
(3) fine particles of fine metallic particles and fine metallic compound particles.

Examples of the fine particles of a composite of two or more kinds of fine metallic compound particles include copper sulfide/silver sulfide composite fine particles.

Examples of the fine particles of fine metallic particles and fine metallic compound particles include silver/silver sulfide composite fine particles and silver/copper(II) oxide composite fine particles.

The shape of the composite particle is not particularly limited. Possible examples include a particle wherein the composition thereof differs between the inside and the surface of the particle, and a particle having two or more particles combined therein.

The particle diameter of the fine particles of the invention is not particularly limited, but the average particle diameter is preferably 60 to 3000 nm, more preferably 70 to 2000 nm, and still more preferably 80 to 200 nm. However, the fine metallic compound particles (which are not composite particles) mentioned in (1) above may be slightly inferior in color when their average particle diameter is less than 60 nm. When the particle diameter is greater than 3000 nm, the particles may not be preferable from the viewpoint of dispersibility.

Particle diameter distribution is not particularly limited either.

The fine particles of the invention should be colored in order to attain the necessary optical density. "Colored" particles are those having optical absorption of wavelengths in the range of 400 to 700 nm. Examples of the colored metallic compound include silver sulfide, copper sulfide, iron sulfide, palladium sulfide, silver oxide, titanium black, and the like.

The shape of the fine particles of the invention is not particularly limited. Fine particles in a spherical, amorphous, plate, cubic, octahedral or pillar form can be used.

If necessary, these particles can be used as a mixture of two or more kinds thereof.

The method of producing these fine particles is not particularly limited. Fine particles produced by a gaseous phase method such as evaporation condensation or gaseous-phase reduction or by a liquid-phase method such as liquid-phase reduction can be used. A method of producing the fine metallic particles is described in for example "Newest Trends in Technology and Application of Superfine Particles II" (in Japanese; published in 2002 by Sumibe Techno Research Co.).

[Fine Metallic Compound Particle Composition]

The fine metallic compound particle composition of the invention comprises fine metallic compound particles, a dispersing medium and a binder. The dispersing medium is not particularly limited, and may be water or an organic solvent. Preferable examples of the organic solvent include methyl alcohol, ethyl alcohol, n-propyl alcohol, 1-propyl alcohol, methyl ethyl ketone, acetone, toluene, xylene, dimethyl amino ethanol, dibutyl amino ethanol, and the like.

The binder includes polymers and polymerizable monomers and oligomers.

In the following, the binder is described.

The binder contained in the light-shielding film of the invention includes polyvinyl alcohol, gelatin, cellulose polymers such as methyl cellulose, and acrylic or styrene acrylic polymers having methyl methacrylate, ethyl acrylate, benzyl acrylate, acrylic acid, methacrylic acid, styrene, and the like, polymerized therein.

In particular, alkali-soluble acrylic or styrene acrylic polymers containing acrylic acid or methacrylic acid are preferable because patterning can be achieved by alkali development.

The total content of acrylic acid and methacrylic acid in the polymer is preferably in the range of 10 to 60% by mass, and more preferably 20 to 50% by mass.

Examples of these polymers include benzyl methacrylate/methacrylic acid=60/40 (this ratio refers to ratio by mass; this applies hereinafter), methyl methacrylate/styrene/methacrylic acid =10/60/30, methyl methacrylate/styrene/acrylic acid/methacrylic acid =20/50/15/15, benzyl methacrylate/ methyl methacrylate/methacrylic acid=40/35/35, styrene/acrylic acid/methacrylic acid=60/20/20, and the like.

The binder may be a monomer or oligomer. Specifically, it is preferable to employ multifunctional acryl monomers such as ethylene glycol (meth)acrylate, triethylene glycol di(meth)acrylate, 1,3-butane diol di(meth)acrylate, tetramethylene glycol di(meth)acrylate, propylene glycol di(meth)acrylate, trimethylol propane tri(meth)acrylate, 1,4-hexane diol di(meth)acrylate, pentaerythritol hexa(meth)acrylate and dipentaerythritol hexa(meth)acrylate.

These multifunctional monomers can be crosslinked by application of light or heat, particularly preferably by photopolymerization using a halomethyl-S-triazine compound such as bis[4-[N-[4-(4,6-bistrichloromethyl-S-triazin-2-yl) phenyl] carbamoyl] phenyl] sebacate as a polymerization initiator.

A polymer for improving the dispersion stability of the fine particles of the invention may further be added to the light-shielding film of the invention. Examples of such polymers (dispersants) include polyvinyl alcohol, acrylamide/acrylic acid copolymers, styrene/maleic anhydride copolymers, sodium polyacrylate, sodium alginate, and the like. As the dispersants, those described in, for example, "Pigment Dispersion Techniques" (in Japanese; published in 1999 by Kazuhiro Takausu, Technical Information Institute Co., Ltd.) can be used. Among these, hydrophobic dispersants are particularly preferable.

The light-shielding film of the invention has a structure wherein the fine particles described above are dispersed in the high-molecular-weight binder. The thickness of the light-shielding film of the invention is preferably 0.05 to 0.5 μm, and more preferably 0.1 to 0.3 μm. When the thickness is greater than 0.5 μm, the unevenness (difference in level between the regions of a substrate which are provided or not provided with the light-shielding film) is too great, which is inconvenient for formation of BRG pixels on the formed film.

On the other hand, when the thickness is less than 0.05 μm, the necessary optical density cannot be obtained, and there arise problems such as reduction in the contrast of the display.

The content of the fine particles in the light-shielding film of the invention, in terms of volume fraction, is preferably 5 to 70%, and more preferably 10 to 50%. The volume fraction refers to the ratio of the whole volume of the fine particles to the whole volume of the light-shielding film.

When the volume fraction is less than 5%, the thickness of the film should be greater than 1 μm in order to achieve the necessary optical density. On the other hand, when the volume fraction is higher than 70%, there arises a problem that the dispersion stability of the fine particles is lowered.

The optical density of the light-shielding film of the invention is preferably 2.0 to 14.0, more preferably 3.5 to 13.0, and still more preferably 6.0 to 12.0. When the optical density is lower than 2.0, the visual quality (for example, the contrast) of the display is reduced. The optical density mentioned herein is average optical density (transmission) at 300 to 650 nm.

[Other Additives]

In addition to the fine particles described above, the following materials may be added as necessary to the light-shielding film of the invention.

(1) Pigment

Black pigments such as carbon black, fine metallic particles, and the like, can be used as the pigment. The fine metallic particles are preferably fine particles of silver, palladium, gold etc. The amount of the pigment added is preferably 50% by mass or less, and more preferably 30% by mass or less, relative to the fine particles of the invention. When the amount of the pigment added is higher than 50% by mass, the thickness of the light-shielding film necessary for achieving the necessary optical density increases, and the quality of red, blue and green pixels formed thereon is reduced.

For further regulation of color, the light-shielding film of the invention may contain blue or other pigments besides the black pigment. The amount of the non-black pigment added is preferably 40% by mass or less, and more preferably 20% by mass or less, relative to the fine particles used in the invention. When the amount of the non-black pigment added is higher than 40% by mass, the color of the light-shielding film may be impaired.

(2) Surfactant

For the purpose of improving coating properties and the dispersion stability of the fine particles, a surfactant can be added to the light-shielding film of the invention. As the surfactant, nonionic, anionic or cationic surfactants can be used without particular limitation. Among these, anionic surfactants are particularly preferable from the viewpoint of stability of dispersion. A fluorine-based surfactant is a preferable surfactant.

Preferable examples of the surfactant include $C_8F_{17}SO_2N(C_2H_5)(C_2H_4O)_{14}H$, $C_8F_{17}SO_3Li$, $C_7F_{15}COONH_4$, $C_8F_{17}SO_2N(C_2H_5)C_2H_4OPO(OH)_2$, and the like. Further, F110, F113, F120, F150, F176 PF, F177, F780 (any of which are oligomer type fluorine-based surfactants manufactured by Dainippon Ink and Chemicals, Incorporated), and the like, are also preferable examples.

[Substrate]

Preferable examples of the substrate used in the invention include a glass substrate usually used in display devices. As the glass substrate, any glass substrate using known glass such as soda glass, low-alkali glass and non-alkali glass can be used. The glass substrate includes those described in, for example, "Introduction to Liquid Crystalline Display Engineering" (in Japanese; authored by Hanae Suzuki and published by The Nikkan Kogyo Shimbun, Ltd.: 1998). A silicon wafer or a transparent plastic such as a polyolefin-based transparent plastic can also be used as the substrate.

The thickness of the substrate is preferably in the range of 0.5 to 3 mm, and more preferably 0.6 to 2 mm.

[Preparation of Light-Shielding Film]

The light-shielding film for display according to the invention can be produced by applying the coating solution for forming the light-shielding film onto a substrate and then drying it or by applying the coating solution onto a temporary support, drying it, and using the resulting recording material having a dried photosensitive layer to transfer the photosensitive layer onto a substrate.

If necessary, the light-shielding film of the invention can be patterned. Patterning methods include a method of light exposure and development, a method of removing an unnecessary part by laser heat (ablation) and a method that involves applying a photosensitive resist film to the light-shielding film of the invention, patterning it by light exposure and development, and then removing the photosensitive resist film. In the invention, any of these methods can be used, but the following methods are preferable from the viewpoint of the ease of the process and the resolution of the patterning.

(1) A method that involves applying a non-photosensitive coating solution for forming the light-shielding film onto a substrate, drying it, applying a photoresist thereon, patterning the photoresist layer by light exposure development and then removing the photoresist layer.

(2) A method that involves applying a photosensitive coating solution for forming the light-shielding film onto a substrate, patterning it by light exposure and development, and then removing the portion not exposed to light.

(3) A method that involves coating a photosensitive coating solution for forming the light-shielding film onto a temporary support, drying it to form a light-shielding layer (colored layer), transferring the light-shielding layer onto a substrate, patterning it by light exposure and development, and then removing the portion not exposed to light (a method of using a photosensitive transfer material).

By use of these methods, the light-shielding film can be formed by a simpler process than in the method of using vapor deposition or sputtering described above. In particular, the method of using a photosensitive transfer material avoids the aggregation of fine particles that occurs during long storage of the coating solution for forming the light-shielding film, and is thus a particularly preferable method.

(Coating Solution for Forming the Light-Shielding Film)

The light-shielding film of the invention can be prepared by applying the following coating solution onto a substrate.

The solvent in the coating solution is not particularly limited. It is possible to use, for example, methyl alcohol, isopropyl alcohol, methyl ethyl ketone, ethyl acetate, toluene and water.

In addition to the fine particles of the invention and the high-molecular-weight binder, the above-described polymers, surfactants, pigments, or the like, may be added to the coating solution. In addition to those described above, a monomer, a polymerization initiator, a polymerization inhibitor, or the like, may be added to confer photosensitivity.

As monomers, polymerization initiators and polymerization inhibitors added to confer photosensitivity, those described in JP-A No. 5-34517 can be used.

(Method of Application onto a Substrate)

The method of application onto a substrate is not particularly limited. For example, a spin coating method as described in JP-A No. 5-224011 or a die coating method as described in JP-A No. 9-323472 can be used.

(Light Exposure and Development)

The light exposure and development processes employed in formation of the light-shielding film of the invention are preferably conducted according to the following.

The light source used in light exposure is selected depending on the photosensitivity of the light-shielding photosensitive resin layer. For example, known light sources such as an ultrahigh pressure mercury lamp, a xenon lamp, a carbon arc lamp and an argon laser can be used. As described in JP-A No. 6-59119, an optical filter with light transmittance of wavelength of 400 nm or more being 2% or less may be used in combination with the light source.

The method of light exposure may be undivided light exposure where the whole surface of the substrate is exposed once to light, or divided light exposure in which the substrate is exposed to light several times. A method of light exposure wherein the surface of the substrate is exposed to light by laser scanning may also be used.

As the developing solution, an aqueous dilute solution of an alkaline substance may be used, and a small amount of a water-miscible organic solvent may be added to the aqueous dilute solution of an alkaline substance. Preferable examples of the alkaline substance include alkali metal hydroxides (for example, sodium hydroxide, potassium hydroxide), alkali metal carbonates (for example, sodium carbonate, potassium carbonate), alkali metal bicarbonates (for example, sodium bicarbonate, potassium bicarbonate), alkali metal silicates (for example, sodium silicate, potassium silicate), alkali metal metasilicates (for example, sodium metasilicate, potassium metasilicate), triethanolamine, diethanolamine, monoethanolamine, morpholine, tetraalkyl ammonium hydroxides (for example, tetramethyl ammonium hydroxide) and trisodium phosphate. Preferably, the concentration of the alkaline substance is 0.01 to 30% by mass, and the pH is 8 to 14. Depending on properties such as oxidation of the light-shielding photosensitive resin layer of the invention, the pH and the like of the developing solution can be changed and regulated to allow development by removing the film of the invention.

Preferable examples of the water-miscible organic solvent include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethyl formamide, dimethyl acetamide, hexamethyl phosphoramide, ethyl lactate, methyl lactate, $\epsilon$-caprolactam and N-methylpyrrolidone. The concentration of the water-miscible organic solvent is generally 0.1 to 30% by mass.

Further, a known surfactant can be added to the developing solution. The concentration of the surfactant is preferably 0.01 to 10% by mass.

The developing solution can be used as a bath liquid or as a spray. To remove an uncured portion of the light-shielding photosensitive resin composition layer in a solid state (preferably in a film state), it is preferable to use a method of rubbing with a rotating brush in the developing solution or rubbing with a moistened sponge, or a method of utilizing spray pressure when spraying the developing solution. The temperature of the developing solution is usually preferably in the vicinity of between room temperature and 40° C. After the development treatment, a step of washing with water can be carried out.

After the development step, heat treatment may be carried out if necessary. The photosensitive light-shielding layer cured by light exposure is heated by this heat treatment, thereby promoting curing to improve solvent resistance and alkali resistance. Heating methods include a method of heating the developed substrate in an electric oven, a drying oven, or the like, or a method of heating it with an infrared lamp. The heating temperature and heating time vary according to the composition and thickness of the photosensitive light-shielding layer, but are preferably 120 to 250° C. and 10 to 300 minutes, and more preferably 180 to 240° C. and 30 to 200 minutes respectively.

After the development step, light exposure to promote curing may be conducted before the heat treatment. This light exposure can be conducted in the same manner as in the first light exposure described above.

(Protective Layer)

In the invention, a step of arranging a protective layer on the light-shielding layer may be conducted after formation of the light-shielding layer and before light exposure. The protective layer is arranged to improve sensitivity by shielding the layer from oxygen during light exposure. Accordingly, the protective layer is a layer containing as a major component an oxygen-shielding resin such as polyvinyl alcohol. This layer becomes unnecessary after formation of the light-shielding film, and is therefore removed by development.

(Photosensitive Transfer Material)

The photosensitive transfer material used in the method described in (3) above comprises a light-shielding layer obtained by applying the photosensitive coating solution for forming the light-shielding film to a temporary support and then drying it.

The temporary support preferably contains a material that is chemically and thermally stable, and flexible. Specifically, the temporary support is preferably a thin sheet of TEFLON®, polyethylene terephthalate, polyethylene naphthalate, polyarylate, polycarbonate, polyethylene or polypropylene or a laminate thereof. When the alkali-soluble thermoplastic resin layer is arranged thereon, the temporary support is preferably easily released therefrom. The thickness of the support is preferably 5 to 300 µm, and more preferably 20 to 150 µm.

<Thermoplastic Resin Layer>

The resin contained in the thermoplastic resin layer in the invention includes acrylic resin, polystyrene resin, polyester, polyurethane, rubber resin, vinyl acetate resin, polyolefin resin, and copolymers thereof. The resin contained in the thermoplastic resin layer in the invention is preferably alkali-soluble although this is not essential.

Specific examples of the resin contained in the thermoplastic resin layer include a saponified product of ethylene and an acrylate copolymer, a saponified product of styrene and a (meth)acrylate copolymer, a styrene/(meth)acrylic acid/(meth)acrylate terpolymer, a saponified product of vinyl toluene and a (meth)acrylate copolymer, saponified products such as poly(meth)acrylates and (meth)acrylate copolymers of butyl (meth)acrylate and vinyl acetate, and alkali-soluble polymers among organic polymers described in "Plastic Performance Handbook" (in Japanese; edited by The Japan Plastics Industry Federation and Zennippon Plastic Seikei Kogyo Rengokai and published by Kogyo Chosakai Publishing Co., Ltd., on Oct. 25, 1968).

These resins are used preferably as a mixture of two or more thereof, as described in the following.

That is, resins having a weight-average molecular weight of 50,000 to 500,000 and a glass transition temperature (Tg) in the range of 0 to 140° C. (referred to hereinafter as resin (A)), and preferably a weight-average molecular weight of 60,000 to 200,000 and a glass transition temperature (Tg) in the range of 30 to 110° C., can be selected from the resins described above. Examples of these resins include those resins soluble in aqueous alkaline solutions as described in Japanese Patent Application Publication (JP-B) Nos. 54-34327, 55-38961, 58-12577, 54-25957, JP-A No. 61-134756, JP-B No. 59-44615, JP-A Nos. 54-92723, 54-99418, 54-137085, 57-20732, 58-93046, 59-97135, 60-159743, OLS 3504254, JP-A Nos. 60-247638, 60-208748, 60-214354, 60-230135, 60-258539, 61-169829, 61-213213, 63-147159, 63-213837, 63-266448, 64-55551, 64-55550, 2-191955, 2-199403, 2-199404, 2-208602 and 5-241340. A methacrylic acid/2-ethylhexyl acrylate/benzyl methacrylate/methyl methacrylate copolymer as described in JP-A No. 63-147159 is particularly preferable.

Resins having a weight-average molecular weight of 3,000 to 30,000 and a glass transition temperature (Tg) in the range of 30 to 170° C. (referred to hereinafter as resin (B)), and preferably a weight-average molecular weight of 4,000 to 20,000 and a glass transition temperature (Tg) in the range of 60 to 140° C., can be selected from the resins described above. Preferable examples can be selected from those described in the above patent specifications, and particularly preferable examples include styrene/(meth)acrylic acid copolymers as described in JP-B No. 55-38961 and JP-A No. 5-241340.

When the weight-average molecular weight of the resin (A) contained in the thermoplastic resin layer is less than 50,000 or the glass transition temperature (Tg) is less than 0° C., reticulation occurs or, during transfer, the thermoplastic resin is pressed out therearound, contaminating a permanent support. When the weight-average molecular weight of the resin (A) is higher than 500,000 or the glass transition temperature (Tg) is higher than 140° C., bubbles form between pixels during transfer, and the ability of the thermoplastic resin to remove an aqueous alkaline solution is impaired.

The thickness of the thermoplastic resin is preferably 6 µm or more. This is because when the thickness of the thermoplastic resin is less than 5 µm, unevenness of 1 µm or more of the substrate provided with the resin thereon cannot be completely absorbed. The upper limit is about 100 µm or less, and preferably about 50 µm or less, from the viewpoint of removability of the aqueous alkaline solution and production suitability.

The coating solvent for the thermoplastic resin layer of the invention can be used without particular limitation insofar as it dissolves a resin contained in this layer, and it is possible to employ, for example, methyl ethyl ketone, n-propanol, i-propanol, and the like.

Further, an alkali-soluble intermediate layer for preventing the alkali-soluble thermoplastic resin layer and the photosensitive light-shielding layer from being mixed upon application is preferably arranged between the two layers.

(Alkali-Soluble Intermediate Layer)

The resin contained in the intermediate layer is not particularly limited insofar as it is alkali-soluble. Examples of such resin include polyvinyl alcohol resin, polyvinyl pyrrolidone resin, cellulose resin, acrylamide resin, polyethylene oxide resin, gelatin, vinyl ether resin, polyamide resin, and copolymers thereof. Resin (for example polyester) that has been rendered alkali-soluble by copolymerizing monomers having a carboxyl group or a sulfonic acid group with resin that is usually not alkali-soluble can also be used.

Among these resins, polyvinyl alcohol is preferable. The polyvinyl alcohol preferably has a saponification degree of 80% or more, and more preferably 83 to 98%.

The resin contained in the intermediate layer is preferably a mixture of two or more resins, and particularly preferably a mixture of polyvinyl alcohol and polyvinyl pyrrolidone. The mass ratio of the two is preferably determined such that polyvinyl pyrrolidone/polyvinyl alcohol is in the range of 1/99 to 75/25, and more preferably 10/90 to 50/50. When the mass ratio is less than 1/99, there may arise problems such as deterioration in the surface of the intermediate layer and insufficient adhesion of the intermediate layer to the photosensitive resin layer arranged thereon. When the mass ratio is higher than 75/25, the oxygen barrier properties of the intermediate layer may be impaired, causing lower sensitivity.

The thickness of the intermediate layer is preferably in the range of 0.1 to 5 µm, and more preferably 0.5 to 3 µm. When the thickness is less than 0.1 µm, the oxygen barrier properties may be impaired, while when the thickness is greater than 5 µm, the time of removal of the intermediate layer during development is increased.

The coating solvent of the intermediate layer is not particularly limited insofar as it can dissolve the above-described resin, but preferably water is used, and a mixed solvent having the above-miscible organic solvent mixed with water is also preferable. Preferable examples of the coating solvent of the intermediate layer include water, water/methanol=90/10, water/methanol=70/30, water/methanol=55/45, water/ethanol=70/30, water/1-propanol=70/30, water/acetone=90/10, and water/methyl ethyl ketone=95/5. The ratio refers to mass ratio.

Because the photosensitive transfer material has the photosensitive resin layer formed from the coating solution containing the fine particles of the invention, a light-shielding film provided with a thin light-shielding layer having high optical density can be prepared therefrom.

The method of transferring the transfer material in the invention onto a substrate is described in the following. Transfer is conducted preferably by a method of laminating the photosensitive transfer layer onto a substrate. In the lamination method, a conventionally known laminator or the like may be used. An auto-cut laminator can also be used to improve productivity. Preferably, the heating temperature in lamination is about 60 to 150° C., and the applied pressure is about 0.2 to 20 kg/cm$^2$. In the invention, lamination is carried out at a substrate line speed preferably in the range of about 0.05 to 10 m/min.

After lamination, the temporary support is released.

The photosensitive transfer material of the invention is laminated on a substrate and then subjected to light exposure and development. In the light exposure and development, the above-described method can be used.

EXAMPLES

Hereinafter, the present invention is described in more detail with reference to examples, but the invention is not limited thereto.

Example 1

[Preparation of Fine Silver Sulfide Particles]

25.2 g silver acetate was dissolved in 100 ml diethylaminoethanol (solution 1). Separately, 25.8 g ammonium sulfide was dissolved in 100 ml ethanol (solution 2). While the solution 1 kept at 25° C. was vigorously stirred, the solution 2 was added thereto. Thereafter, the mixture was stirred gently for 15 minutes. The mixture turned black to form silver sulfide. Thereafter, the mixture was left for 8 hours to precipitate silver sulfide, and the supernatant was discarded. Then, 100 ml methyl ethyl ketone was added thereto, stirred for 15 minutes and then left for 8 hours to precipitate silver sulfide, and the supernatant was discarded. This procedure was repeated again. The volume of the silver sulfide slurry thus obtained was adjusted to 50 ml by adding methyl ethyl ketone.

This silver sulfide dispersion, together with 40 g glass beads of 3 mm in diameter, was introduced into a glass bottle having a volume of 100 ml and then dispersed for 6 hours with a paint shaker. After dispersion, the glass beads were removed, whereby a silver sulfide fine particle dispersion A-1 was obtained. The volume of the resulting dispersion was 47 mL, and the amount of silver sulfide was 17.2 g. The average particle diameter of the fine particles determined by observation under a scanning electron microscope was about 80 nm.

[Preparation of Photosensitive Light-Shielding Layer Coating Solution]

The following additives were added to the prepared fine particle dispersion A-1 to prepare a photosensitive light-shielding layer coating solution.

| | |
|---|---|
| Fine particle dispersion A-1 | 40.0 ml |
| Polymer P-1 | 6.0 g |
| F780F (trade name, 20% fluorine-based surfactant manufactured by Dainippon Ink and Chemicals, Incorporated) | 0.1 g |

-continued

| | |
|---|---|
| Hydroquinone monomethyl ether | 0.001 g |
| Dipentaerythritol hexaacrylate | 6.0 g |
| Bis[4-[N-[4-(4,6-bistrichloromethyl-s-triazin-2-yl) phenyl] carbamoyl]phenyl] sebacate | 0.1 g |

(Polymer P-1: Benzyl Methacrylate/Methacrylic Acid=60/40 (wt/wt), Molecular Weight 35000)

[Preparation of Protective Layer Coating Solution]

The following components were mixed to give a protective layer coating solution.

| | |
|---|---|
| Polyvinyl alcohol (trade name: PVA 205, manufactured by Kuraray Co., Ltd.) | 3.0 g |
| Polyvinyl pyrrolidone (trade name: PVP-K30, manufactured by GAF Corporation) | 1.5 g |
| Distilled water | 50.5 g |
| Methyl alcohol | 45.0 g |

[Preparation of Photosensitive Material]

The photosensitive light-shielding layer coating solution was applied by a spin coater onto a glass substrate such that the optical density became 3.8, and then dried at 100° C. for 5 minutes. Then, the protective layer coating solution was applied by the spin coater thereon such that the thickness of the dried film became 1.5 μm, and then dried at 100° C. for 5 minutes.

[Measurement of Film Thickness]

The thickness of the film was measured by using a contact-type surface roughness meter P-1 (trade name, manufactured by TENKOP).

[Measurement of Optical Density]

The optical density of the film was measured by the following method. The optical density (OD) of the photosensitive light-shielding layer arranged on the glass substrate was measured by a MacBeth densitometer (trade name: TD-904, manufactured by MacBeth). Separately, the optical density ($OD_0$) of the glass substrate was measured in the same manner. OD minus $OD_0$ was regarded as the optical density of the film.

[Formation of Light-Shielding Film]

The coating on the substrate was exposed to 70 mJ/cm$^2$ light with an ultrahigh pressure mercury lamp. Then, the coating was developed (33° C., 20 seconds) in a development treatment solution TCD (trade name, alkaline development solution manufactured by Fuji Photo Film Co., Ltd.) to give a light-shielding film.

The results are shown in FIG. 1.

Example 2

A light-shielding film was obtained in the same manner as in Example 1 except that the following silver/silver sulfide composite fine particle dispersion A-2 was used in place of the silver sulfide fine particle dispersion A-1. The results are shown in Table 1.

[Preparation of Silver/Silver Sulfide Composite Fine Particles]

25.2 g silver acetate was dissolved in 100 ml diethylaminoethanol (solution 3). Separately, 12.9 g ammonium sulfide and 5.6 g hydroxy acetone were dissolved in 100 ml ethanol (solution 4). While the solution 3, kept at 25° C., was vigorously stirred, the solution 4 was added thereto. Thereafter, the mixture was stirred gently for 15 minutes. The mixture turned black to form silver/silver sulfide. Thereafter, the mixture was left for 8 hours to precipitate silver/silver sulfide, and the supernatant was discarded. Then, 100 ml methyl ethyl ketone was added thereto, stirred for 15 minutes and then left for 8 hours to precipitate silver/silver sulfide, and the supernatant was discarded. This procedure was repeated again. The volume of the silver/silver sulfide slurry thus obtained was adjusted to 50 ml by adding methyl ethyl ketone.

This silver/silver sulfide dispersion, together with 40 g glass beads of 3 mm in diameter, was introduced into a glass bottle having a volume of 100 ml and then dispersed for 6 hours with a paint shaker (silver/silver sulfide fine particle dispersion A-2).

The average particle diameter as determined in the same manner as in Example 1 was 65 nm.

Example 3

A light-shielding film was obtained in the same manner as in Example 1 except that the following copper(II) sulfide/silver sulfide composite fine particle dispersion A-3 was used in place of the silver sulfide fine particle dispersion A-1. The results are shown in Table 1.

The average particle diameter as determined in the same manner as in Example 1 was 85 nm.

[Preparation of Copper(II) Sulfide/Silver Sulfide Composite Fine Particles]

12.6 g silver acetate and 13.6 g copper(II) acetate were dissolved in 100 ml diethylaminoethanol (solution 5). Separately, 38.7 g ammonium sulfide was dissolved in 200 ml ethanol (solution 6). While the solution 5 kept at 25° C. was vigorously stirred, the solution 6 was added thereto. Thereafter, the mixture was stirred gently for 15 minutes. The mixture turned black to form copper(II) sulfide/silver sulfide. Thereafter, the mixture was left for 8 hours to precipitate silver sulfide, and the supernatant was discarded. Then, 100 ml methyl ethyl ketone was added thereto, stirred for 15 minutes and then left for 8 hours to precipitate copper(II) sulfide/silver sulfide, and the supernatant was discarded. This procedure was repeated again. The volume of the copper(II) sulfide/silver sulfide slurry thus obtained was adjusted to 50 ml by adding methyl ethyl ketone.

This silver sulfide dispersion, together with 40 g glass beads of 3 mm in diameter, was introduced into a glass bottle having a volume of 100 ml and then dispersed for 6 hours with a paint shaker (copper sulfide/silver sulfide fine particle dispersion A-3).

Example 4

[Composition of Photosensitive Light-Shielding Layer Coating Solution]

The same as in Example 1.

[Composition of Intermediate Layer Coating Solution]

The same as in the composition of the protective layer Example 1.

[Composition of Thermoplastic Resin Layer Coating Solution]

| | |
|---|---|
| Methyl methacrylate/2-ethylhexyl acrylate/benzyl methacrylate/methacrylic acid = 54/12/5/29 copolymer (number-average molecular weight 80000) | 58 g |
| Styrene/acrylic acid = 70/30 copolymer (number-average molecular weight 7000) | 136 g |
| BPE-500 (trade name, multifunctional acrylate manufactured by Shin-Nakamura Chemical Co., Ltd.) | 90 g |
| F176PF (trade name, fluorine-based surfactant manufactured by Dainippon Ink and Chemicals, Incorporated) | 1 g |
| Methyl ethyl ketone | 541 g |
| 1-Methoxy-2-propanol | 63 g |
| Methyl alcohol | 111 g |

[Preparation of Transfer Material]

The thermoplastic resin layer coating solution was applied by a slit coater onto a biaxially stretched polyethylene terephthalate support of 75 μm in thickness such that the thickness of the dried film became 5 μm, and then dried at 100° C. for 3 minutes. Then, the intermediate layer coating solution was applied thereon such that the thickness of the dried film became 1.5 μm, and then dried at 100° C. for 3 minutes. Then, the fine particle-containing layer coating solution was applied thereon such that the optical density became 3.8, and then dried at 100° C. for 3 minutes. The transfer material was prepared in the manner described above.

[Measurement of Photosensitive Material]

The transfer material was stacked on a glass substrate such that the photosensitive light-shielding layer was contacted with the glass substrate and laminated by a laminator (trade name: VP-II, manufactured by Osaka Laminator Co., Ltd.) at a pressure of 0.8 kg/cm$^2$ at a temperature of 130° C. Then, the polyethylene terephthalate support was released. Thereafter, the same light exposure was conducted and the following development was carried out.

As the development treatment solution, CDK-1 (trade name, manufactured by Fuji Film Arch) was diluted 100-fold and used in development at 30° C. for 60 seconds.

The resulting sample was evaluated in the same manner as in Example 1. The results are shown in Table 1.

Example 5

A light-shielding film was obtained in the same manner as in Example 4 except that the fine particle-containing layer coating solution used in Example 2 was used as the fine particle-containing layer coating solution. The results are shown in Table 1.

Example 6

A light-shielding film in Example 6 was obtained in the same manner as in Example 4 except that the fine particle-containing layer coating solution used in Example 3 was used as the fine particle-containing layer coating solution. The results are shown in Table 1.

Example 7

A light-shielding film in Example 7 was obtained in the same manner as in Example 2 except that the following solutions 3' and 4' were used as the solutions 3 and 4 in Example 2. The results are shown in Table 1.

(Solution 3')

A solution of 8.4 g silver acetate in 100 ml diethylaminoethanol.

(Solution 4')

A solution of 4.3 g ammonium sulfide and 5.6 g hydroxy acetone in 100 ml ethanol.

Example 8

Example 8 was carried out in the same manner as in Example 4 except that the following solutions were used as the fine particle-containing layer coating solution. The results are shown in Table 1.
Solution 9: A solution of 2.5 g silver acetate in 100 ml diethanol amine.
Solution 10: A solution of 2.6 g ammonium sulfide in 100 ml ethanol.

Example 9

Example 9 was carried out in the same manner as in Example 4 except that the following solutions were used as the fine particle-containing layer coating solution. The results are shown in Table 1.
Solution 11: A solution of 8.6 g silver acetate in 100 ml diethanol amine.
Solution 12: A solution of 4.3 g ammonium sulfide and 1.9 g hydroxy acetone in 100 ml ethanol.

Example 10

Example 10 was carried out in the same manner as in Example 4 except that the following solutions were used as the fine particle-containing layer coating solution. The results are shown in Table 1.
Solution 13: A solution of 2.6 g silver acetate in 100 ml diethanol amine.
Solution 14: A solution of 1.3 g ammonium sulfide and 0.6 g hydroxy acetone in 100 ml ethanol.

Example 11

Example 11 was carried out in the same manner as in Example 4 except that the following solutions were used as the fine particle-containing layer coating solution. The results are shown in Table 1.
Solution 13: A solution of 4.3 g silver acetate and 4.5 g copper(II) acetate in 100 ml diethanol amine.
Solution 14: A solution of 12.9 g ammonium sulfide in 100 ml ethanol.

Example 12

Example 12 was carried out in the same manner as in Example 4 except that the following solutions were used as the fine particle-containing layer coating solution. The results are shown in Table 1.
Solution 15: A solution of 1.3 g silver acetate and 1.4 g copper(II) acetate in 100 ml diethanol amine.
Solution 16: A solution of 1.3 g ammonium sulfide in 100 ml ethanol.

Example 13

Example 13 was carried out in the same manner as in Example 4 except that a dispersion of fine particles of Mn—Fe—Cu oxide in ethanol (trade name: Nanotec Black, manufactured by CI Kasei) was used. The results are shown in Table 1.

Comparative Example 1

Comparative Example was carried out in the same manner as in Example 1 except that the following carbon black dispersion B-1 was used in place of the silver sulfide fine particle dispersion A-1.

[Carbon Black Dispersion B-1]

3.8 g carbon black (trade name: Regal 400, manufactured by Regal) and 0.38 g Solsperse 20000 (trade name, dispersant manufactured by Avecia Ltd.) were mixed with 50 ml methyl ethyl ketone. The mixture was mixed with 40 g of 3 mm glass beads and dispersed for 6 hours with a paint shaker. Then, the glass beads were removed, whereby carbon black dispersion B-1 was obtained.

The results are shown in Table 1.

TABLE 1

| Sample No. | Fine particles | Average particle diameter (nm) | Optical density | Film thickness (μm) | Tint |
|---|---|---|---|---|---|
| Example 1 | Silver sulfide | 80 | 3.8 | 0.43 | A (black) |
| Example 2 | Silver/silver sulfide | 65 | 3.8 | 0.43 | A (black) |
| Example 3 | Copper(II) sulfide/silver sulfide | 85 | 3.8 | 0.49 | A (black) |
| Example 4 | Silver sulfide | 80 | 3.8 | 0.41 | A (black) |
| Example 5 | Silver/silver sulfide | 65 | 3.8 | 0.41 | A (black) |
| Example 6 | Copper(II) sulfide/silver sulfide | 85 | 3.8 | 0.47 | A (black) |
| Example 7 | Silver sulfide | 45 | 3.8 | 0.45 | B (brownish black) |
| Example 8 | Silver sulfide | 15 | 3.8 | 0.49 | B (brownish black) |
| Example 9 | Silver/silver sulfide | 48 | 3.8 | 0.49 | A (black) |
| Example 10 | Silver/silver sulfide | 19 | 3.8 | 0.50 | A (black) |
| Example 11 | Copper(II) sulfide/silver sulfide | 48 | 3.8 | 0.5 | A (black) |
| Example 12 | Copper(II) sulfide/silver sulfide | 22 | 3.8 | 0.49 | A (black) |
| Example 13 | Mn—Fe—Cu oxide | 46 | 3.8 | 0.46 | A–B (slightly brownish black) |
| Comparative Example 1 | Carbon black | 65 | 3.8 | 1.45 | A (black) |

Example 14

A thermoplastic resin layer, an intermediate layer and a photosensitive light-shielding layer were arranged on a biaxially stretched polyethylene terephthalate support of 75 μm in thickness in the same manner as in Example 4, whereby a transfer material was obtained.

Then, lamination was carried out by the same method as in Example 4. However, the pressure and temperature were 1.1 kg/cm² and 125° C. respectively. After lamination, the polyethylene terephthalate support was released. The laminated transfer material was exposed to 70 mJ/cm² light. This light exposure was conducted by an undivided light exposure system where the whole surface of the substrate was exposed once to light.

Thereafter, development was carried out in the following steps.

Development 1: Development treatment solution TPD (trade name, alkaline developing solution manufactured by Fuji Photo Film Co., Ltd.) 33° C.×20 seconds Development 2: Development treatment solution TCD (trade name, alkaline developing solution manufactured by Fuji Photo Film Co., Ltd.) 33° C.×20 seconds Washing with water: 25° C.×20 seconds Drying: 40° C.×60 seconds Then, the substrate was heat-treated for 40 minutes in a drying oven at 220° C.

The substrate provided with a light-shielding film was prepared in this manner.

The resulting light-shielding film has a checked pattern consisting of a line having a width of 15 μm with a window of 270 μm in length and 80 μm in width.

Red, blue and green pixels were stuck in the following manner to the substrate to prepare a color filter.

A transfer material having red, blue and green layers (R layer, B layer and G layer respectively) as described in Example 1 in JP-A No. 5-34517 was used. A photosensitive resin layer in the red transfer material was contacted with the substrate and laminated at a pressure of 0.8 kg/cm² at a temperature of 130° C. at a line speed of 0.3 m/min. by a laminator (trade name: VP-II, manufactured by Taisei Laminator). Then, the temporary support was released. Then, the laminated transfer material was exposed via a mask to 200 mJ/cm² with a high-pressure mercury. After light exposure, the same development and heating treatment as in preparation of the light-shielding film were conducted. In this manner, red pixels were formed on the substrate.

Using the blue and green transfer materials, blue and green pixels were formed in the same manner as described above to give a color filter.

The resulting color filter was evaluated as follows.

[Measurement of Film Thickness]

The thickness of the substrate provided with the light-shielding film, as determined in the same manner as in Example 1, was 0.42 μm.

[Measurement of Optical Density]

The optical density of the substrate provided with the light-shielding film, as determined in the same manner as in Example 1, was 3.8.

[Evaluation of Tint]

The tint of the substrate provided with the light-shielding film, observed with naked eyes, was an excellent tint.

[Evaluation of Bubbles]

100 red pixels were observed under an optical microscope (×200) to confirm whether bubbles were present or not in the pixels. The number of bubbles was 0.

Comparative Example 2

Comparative Example 2 was carried out in the same manner as in Example 14 except that the following material was used as the photosensitive light-shielding layer coating solution.

[Carbon Black Dispersion B-2]

1.8 g carbon black (trade name: Regal 400, manufactured by Regal) and 0.18 g Solsperse 20000 (dispersant manufactured by Avecia Ltd.) were mixed with 50 ml methyl ethyl ketone and 40 g of 3 mm glass beads, and then dispersed for 6 hours with a paint shaker. After dispersion, the glass beads were removed, whereby carbon black dispersion B-2 was obtained. The volume of the resulting dispersion was 46 mL.

[Preparation of Photosensitive Light-Shielding Layer Coating Solution]

The following additives were added to the carbon black dispersion to give a photosensitive light-shielding layer coating solution.

| | |
|---|---|
| Carbon black dispersion B-2 | 40 ml |
| Polymer P-1 | 4.2 g |
| F780F | 0.1 g |
| Hydroxyquinone monomethyl ether | 0.001 g |
| Dipentaerythritol hexaacrylate | 4.2 g |
| Bis[4-[N-(4,6-bistrichloromethyl-s-triazin-2-yl)phenyl]carbamoyl] phenyl sebacate | 0.07 g |

The color filter obtained in this manner was evaluated in the same manner as in Example 14.

The results are shown below.

[Evaluation of Film Thickness, Optical Density and Tint]

The film thickness, optical density and tint as determined by the same methods as in Example 14 were 1.82 μm, 3.8, and an excellent tint of black, respectively.

[Evaluation of Bubbles]

The number of bubbles as determined in the same manner as in Example 9 was 18.

As can be seen from the foregoing, the light-shielding film of the invention is a thin film having high optical density and excellent in tint. Further, the light-shielding film of the invention does not cause inconveniences such as generation of bubbles upon forming red, blue and green pixels.

According to the invention, the light-shielding film having these advantages can be obtained without using materials and techniques causing a heavy burden on the environment such as in chrome plating techniques.

The light-shielding film for display according to the invention is a thin film having high light shielding performance with a lower burden on the environment and excellent in tint.

What is claimed is:

1. A composition comprising colored metallic compound particles, a dispersing medium and a binder, wherein after the composition is formed into a film, the film has an optical density of 2.0 or more per 1 μm of dry-film thickness, wherein the particles are silver/silver sulfide composite particles or copper (II) sulfide/silver sulfide composite particles, wherein the copper (II) sulfide/silver sulfide composite particles consist of copper (II) sulfide and silver sulfide.

2. A composition according to claim 1, wherein the average particle diameter of the metallic compound particles is 60 to 3000 nm.

3. A coating solution composition for forming a light-shielding film arranged in a display device and shading a part of a display screen as a part of a color filter, containing the composition of claim 1, wherein the light-shielding film comprises a polymer binder, and has an optical density of 2.0 or more in a light-shading region.

4. A coating solution composition according to claim 3, Wherein the average particle diameter of the metallic compound particles is 60 to 3000 nm.

5. A coating solution composition according to claim 3, wherein the thickness of the light-shielding film is 0.5 μm or less.

6. A method of forming a light-shielding film arranged in a display device and shading a part of a display screen as a part of a color filter, comprising applying the coating solution composition of claim 3 to a substrate or a temporary support.

7. A composition according to claim 1, wherein the particles are silver/silver sulfide composite particles.

8. A transfer material comprising a colored layer formed by applying a coating solution, containing the composition of claim 1, to temporary support and drying it thereon.

9. A transfer material according to claim 8, wherein the average particle diameter of the metallic compound particles is 60 to 3000 nm.

10. A light-shielding film arranged in a display device and shading a part of a display screen as a part of a color filter, which light-shielding film comprises metallic compound particles having an average particle diameter of 60 to 3000 nm and a polymer binder, and has an optical density of 2.0 or more in a light-shading region, wherein the particles are silver/silver sulfide composite particles or copper (II) sulfide/silver sulfide composite particles.

11. A light-shielding film according to claim 10, wherein the thickness of the light-shielding film is 0.5 μm or less.

12. A display substrate having the light-shielding film according to claim 10.

13. A display substrate according to claim 12, wherein the thickness of the light-shielding film is 0.5 μm or less.

14. A color filter for a display device comprising the light-shielding film according to claim 10.

15. A color filter for a display device according to claim 14, wherein the thickness of the light-shielding film is 0.5 μm or less.

16. A method of forming a light-shielding film arranged in a display device and shading a part of a display screen as a part of a color filter, comprising transferring the colored layer of a transfer material onto a substrate, wherein the light-shielding film comprises metallic compound particles having an average particle diameter of 60 to 3000 nm and a polymer binder, and has an optical of 2.0 or more in a light-shading region,
   wherein the transfer material comprises a colored layer formed by applying a coating solution to a temporary support and drying it thereon,
   wherein the coating solution contains a composition comprising colored metallic compound particles, a dispersing medium and a binder, wherein after the composition is formed into a film, the film has an optical density of 2.0 or more per 1 μm of dry-film thickness, wherein the particles are silver/silver sulfide composite particles or copper (II) sulfide/silver sulfide composite particles.

17. A method of forming a light-shielding film according to claim 16, wherein the thickness of the light-shielding film is 0.5 μm or less.

18. A method of forming a light-shielding film arranged in a display device and shading a part of a display screen as a part of a color filter, comprising applying a coating solution composition to a substrate or a temporary support,
   wherein the coating solution composition is a coating solution composition for forming a light-shielding film arranged in a display device and shading a part of a display screen as a part of a color filter, containing a composition comprising colored metallic compound particles, a dispersing medium and a binder, wherein after the composition is formed into a film, the film has an optical density of 2.0 or more per 1 μm of dry-film thickness, wherein the particles are silver/silver sulfide composite particles or copper (II) sulfide/silver sulfide composite particles, wherein the light-shielding film comprises a polymer binder, and has an optical density of 2.0 or more in a light-shading region.
   wherein the thickness of the light-shielding film is 0.5 μm or less.

* * * * *